(12) United States Patent
Spies et al.

(10) Patent No.: US 8,079,087 B1
(45) Date of Patent: *Dec. 13, 2011

(54) UNIVERSAL RESOURCE LOCATOR VERIFICATION SERVICE WITH CROSS-BRANDING DETECTION

(75) Inventors: Terence Spies, San Mateo, CA (US); Matthew J. Pauker, San Francisco, CA (US); Rishi R. Kacker, Palo Alto, CA (US); Guido Appenzeller, Menlo Park, CA (US); Sathvik Krishnamurthy, San Jose, CA (US)

(73) Assignee: Voltage Security, Inc., Cupertino, CA (US)

(*) Notice: Subject to any disclaimer, the term of this patent is extended or adjusted under 35 U.S.C. 154(b) by 985 days.

This patent is subject to a terminal disclaimer.

(21) Appl. No.: 11/314,064

(22) Filed: Dec. 20, 2005

Related U.S. Application Data

(60) Provisional application No. 60/677,422, filed on May 3, 2005.

(51) Int. Cl.
    *G06F 7/04* (2006.01)
(52) U.S. Cl. ............ 726/26; 726/22; 709/205; 709/206; 709/207; 709/217; 709/225; 709/229
(58) Field of Classification Search .................... 726/22, 726/26; 709/205–207, 217, 225, 232
    See application file for complete search history.

(56) References Cited

U.S. PATENT DOCUMENTS

| | | | |
|---|---|---|---|
| 6,442,606 B1* | 8/2002 | Subbaroyan et al. ......... 709/224 |
| 7,152,244 B2* | 12/2006 | Toomey ........................... 726/26 |
| 7,296,016 B1* | 11/2007 | Farach-Colton et al. ......... 707/5 |
| 7,457,823 B2* | 11/2008 | Shraim et al. ........................ 1/1 |
| 7,590,698 B1* | 9/2009 | Cooley ........................... 709/206 |
| 7,698,442 B1* | 4/2010 | Krishnamurthy et al. .... 709/229 |
| 7,769,820 B1* | 8/2010 | Spies et al. ..................... 709/218 |
| 7,870,608 B2* | 1/2011 | Shraim et al. ................... 726/22 |
| 7,913,302 B2* | 3/2011 | Shraim et al. ................... 726/22 |
| 7,992,204 B2* | 8/2011 | Shraim et al. ................... 726/22 |
| 7,996,910 B2* | 8/2011 | Toomey .......................... 726/26 |
| 2002/0133720 A1* | 9/2002 | Sherman et al. .............. 713/201 |
| 2004/0078422 A1* | 4/2004 | Toomey ........................ 709/202 |
| 2004/0123157 A1* | 6/2004 | Alagna et al. ................. 713/201 |
| 2006/0021031 A1* | 1/2006 | Leahy et al. .................... 726/22 |

(Continued)

OTHER PUBLICATIONS

Spoofstick V1.0, Jun. 6, 2004 available at spoofstick.com.*

(Continued)

*Primary Examiner* — Kamal Divecha
(74) *Attorney, Agent, or Firm* — Treyz Law Group; G. Victor Treyz; Nancy Y. Ru

(57) ABSTRACT

A URL verification service is provided that is used to evaluate the trustworthiness of universal resource locators (URLs). As a user browses the world wide web, the URL for a web page to which the user is browsing is evaluated. A brand and a second level domain portion may be extracted from the URL and used as search engine inputs in evaluating the trustworthiness of the URL. The content of the web page can also be analyzed. Page elements may be extracted from the web page and compared to page elements in a brand indicator table to identify page brands associated with the web page. The brand extracted from the URL is compared to the page brands to detect cross-branding. If cross-branding is detected, the URL verification service helps to prevent the user from submitting sensitive information over the internet.

12 Claims, 11 Drawing Sheets

U.S. PATENT DOCUMENTS

| | | | |
|---|---|---|---|
| 2006/0041508 A1* | 2/2006 | Pham et al. | 705/50 |
| 2006/0041754 A1* | 2/2006 | Hind et al. | 713/176 |
| 2006/0080437 A1* | 4/2006 | Lake | 709/225 |
| 2006/0123464 A1* | 6/2006 | Goodman et al. | 726/2 |
| 2006/0123478 A1* | 6/2006 | Rehfuss et al. | 726/22 |
| 2007/0101427 A1* | 5/2007 | Toomey | 726/22 |
| 2007/0192853 A1* | 8/2007 | Shraim et al. | 726/22 |
| 2007/0294352 A1* | 12/2007 | Shraim et al. | 709/206 |
| 2007/0294762 A1* | 12/2007 | Shraim et al. | 726/22 |

OTHER PUBLICATIONS

U.S. Appl. No. 10/671,319, filed Sep. 24, 2003, Delany.
U.S. Appl. No. 10/805,181, filed Mar. 19, 2004, Delany.
Neil Chou et al. "Client-side defense against web-based identity theft", printed from internet at http://crypto.stanford.edu/SpoofGuard/webspoof.pdf.
Zoltan Gyongyi et al., "Combating Web Spam with TrustRank," Mar. 1, 2004. Printed from internet.

* cited by examiner

| BRAND INDICATOR TABLE ||
| --- | --- |
| PAGE ELEMENTS | RELATED BRAND |
| www.brand123.com/passwordreset | BRAND123 |
| "BRAND123", "SCREEN NAME" | BRAND123 |
| "BRAND456", "ACCOUNT NUMBER" | BRAND456 |
| ⋮ | |

FIG. 10

UNIVERSAL RESOURCE LOCATOR VERIFICATION SERVICE WITH CROSS-BRANDING DETECTION

This application claims the benefit of provisional patent application No. 60/677,422, filed May 3, 2005, which is hereby incorporated by reference herein in its entirety.

BACKGROUND OF THE INVENTION

This invention relates to evaluating the trustworthiness of universal resource locators (URLs) such as those associated with web pages.

The world wide web is often used for sensitive transactions such as those involved in online banking and e-commerce. In a typical scenario, a user obtains access to an account at a financial institution by supplying a valid username and password.

The popularity of online services has given rise to fraud. One type of fraud, known as "phishing," involves sending fraudulent email messages to recipients to entice them to reveal their username and password or other sensitive information to an unauthorized party. Often the content of a fraudulent email is in html format and contains graphics and text that make the recipient believe that the fraudulent email was sent by a legitimate institution. For example, the fraudulent email may contain an accurate rendition of the logo of the recipient's bank.

The text of the fraudulent email may instruct the recipient to click on an embedded web link (URL). When the recipient clicks on the web link, the recipient's web browser presents the recipient with a fraudulent web page that appears to be associated with the recipient's institution. The fraudulent web page generally contains the institution's logo and other content that makes the web page difficult or impossible to distinguish from a legitimate web page associated with the institution. The fraudulent web page also contains text that prompts the recipient to log in to the institution by supplying appropriate credentials such as a username and password. When the recipient clicks on a login button on the fraudulent web page, the recipient's username and password are transmitted to the perpetrator of the fraud. The user credentials that have been fraudulently collected in this way may then be used to make unauthorized transactions at the recipient's institution.

What is needed is a way in which to help prevent fraud by verifying whether URLs are legitimate.

SUMMARY OF THE INVENTION

A URL verification service is provided that determines whether URLs are associated with legitimate web sites and can be trusted or are associated with fraudulent web sites and cannot be trusted.

As a user surfs the internet with a web browser, the user attempts to access a web page of interest using its universal resource locator (URL). The URL may appear to be legitimately associated with a brand. For example, the URL may contain a name that appears to be the name of the user's bank.

A URL verification engine extracts the apparent brand from the URL. The brand may be extracted, for example, by identifying the second level domain portion of the URL and discarding the top level domain portion of the second level domain.

The URL verification service evaluates whether the extracted brand is legitimately associated with the URL. With one suitable arrangement, the extracted brand and second level domain are used as search engine query terms. The results of querying the search engine are indicative of the brand's popularity and the relationship between the brand and the second level domain. These results can be analyzed to determine whether the brand and URL are legitimately associated with each other. If it is determined that the brand and URL are not legitimately associated with each other, the URL is untrusted and the user can be notified accordingly.

If the URL verification engine does not determine that the URL is untrusted, the content of the web page can be analyzed. In particular, page elements such as text strings, logos, and web links may be extracted from the web page. The page elements may be compared to a list of page elements contained in a brand indicator table. The brand indicator table contains a list of brands that are associated with various page elements. As a result of the page element comparison, the URL verification engine identifies one or more brands. The identified brands are referred to as page brands because they are identified from the content of the web page and appear to the user to be legitimately associated with the web page.

The brand that was extracted from the URL by the URL verification engine is compared to the page brands. If there is a match, the page brand identity and the identity of the extracted brand are the same, so the URL can be trusted. If the extracted brand and page brands do not match, the page has been cross branded. In a cross-branding situation, an attacker publishes a web page containing a first brand on a web site associated with a second brand. Cross-branding generally does not arise on normal web sites, so, when viewed in light of other risk factors, the presence of cross-branding can indicate that the URL is untrusted even in situations in which the URL appears to be legitimately associated with a brand extracted from the URL.

Fraudulent URLs are most dangerous to the user when the user is being asked to supply sensitive information over the internet. Accordingly, if cross-branding is detected, the URL verification engine may analyze the web page to determine whether the user is being asked to submit sensitive information. If, for example, the user is being asked to provide a credit card number or other sensitive financial information, the URL can be treated as being untrusted to protect the user.

Further features of the invention, its nature and various advantages will be more apparent from the accompanying drawings and the following detailed description of the preferred embodiments.

BRIEF DESCRIPTION OF THE DRAWINGS

FIG. 10 is a diagram of an illustrative brand indicator table of the type that may be used to specify which brands are related to web page elements in accordance with the present invention.

DETAILED DESCRIPTION OF THE PREFERRED EMBODIMENTS

The present invention relates to systems and methods for ascertaining whether universal resource locators (URLs) and the web pages and web sites associated with the URLs are legitimate or fraudulent.

URLs are typically associated with web pages and the invention is described in the context of web pages for clarity. In general, however, URLs may be used as links to any suitable resource. If a URL for a web page is determined to be fraudulent, the web page and web site associated with that URL are also fraudulent, so the URL verification process is sometimes referred to as a "web page" or "web site" authentication process.

In accordance with the present invention, URL authentication operations are performed using a URL verification service. The URL verification service is implemented on a system that runs one or more URL verification engines and associated software components.

Both client-oriented and server-based architectures can be used for the URL verification service. With a client-based architecture, a URL verification engine runs locally on a user's computer. With a server-based architecture, a URL verification engine runs on a remote server that interacts with a user's client over the internet.

As a user surfs the internet, the user identifies a URL of interest and attempts to access the web page associated with that URL. The user may, for example, click on a link in an email message or may follow a link embedded in a web page or other document. The URL verification engine processes the URL and related information such as the content of the web page associated with the URL to determine the authenticity of the URL. The user is then notified of the results of the verification operation. If the web site is legitimate, the user can continue to surf the internet. If the web site is fraudulent, the user can be warned or other suitable actions taken. A URL is authentic if the brand such as the name of an organization that the user believes to be associated with the URL is in fact legitimately associated with the URL. A web site that appears to be associated with a particular brand, but which is actually associated with a perpetrator of a fraud is fraudulent, because the site and its URL are not legitimately associated with the brand.

Figure 1:
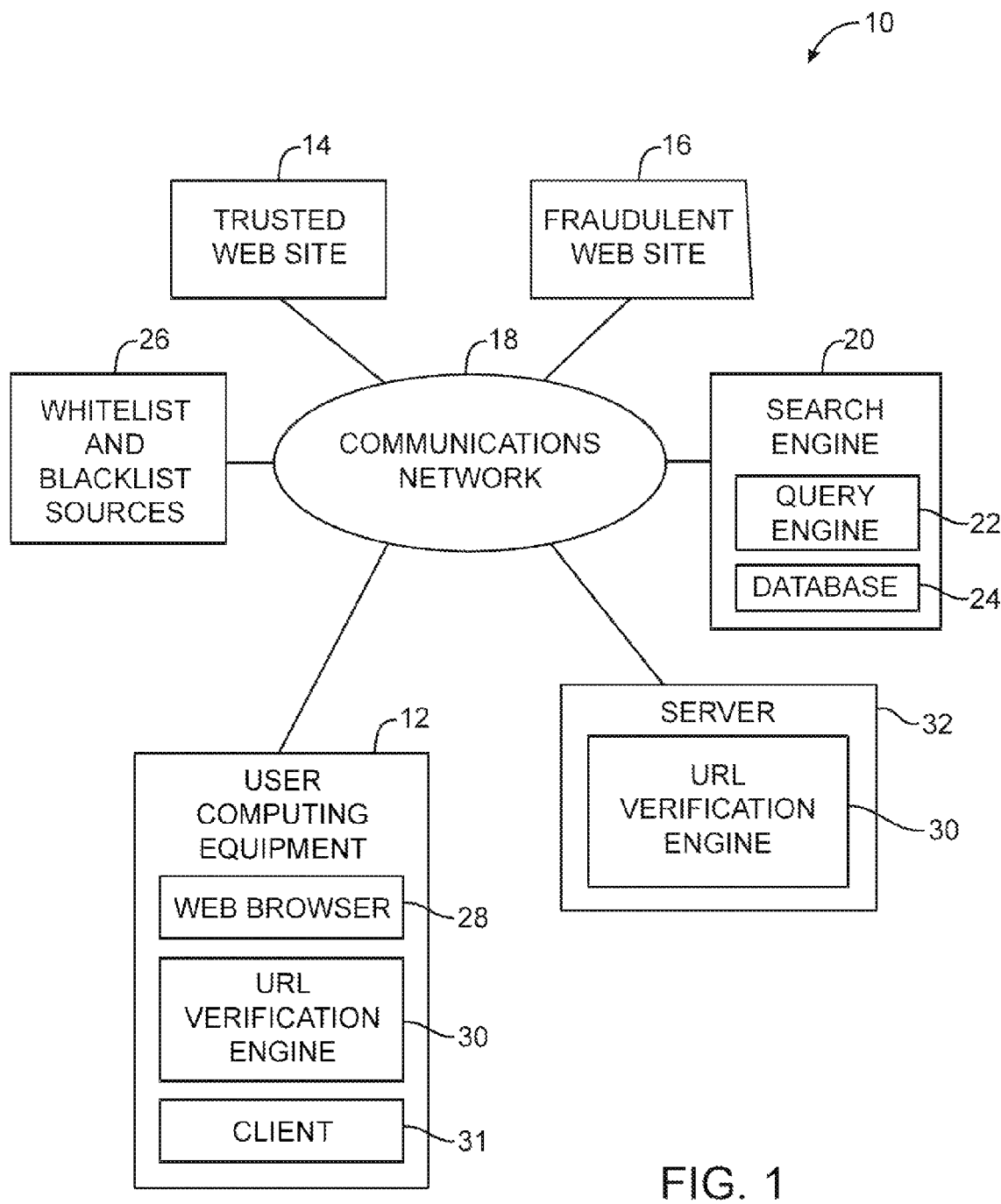
FIG. 1 is a diagram of an illustrative web site verification system in accordance with the present invention.

An illustrative system environment in which a URL verification service may operate in accordance with the present invention is shown in FIG. 1. Users in system 10 have computing equipment 12. A web browser 28 and a URL verification engine 30 operate at equipment 12. The computing equipment 12 may be used to access trusted web sites 14 and fraudulent web sites 16 over communications network 18 (e.g., the internet).

One or more internet search engines 20 or other suitable database entities provide information that is used for evaluating URL authenticity. Each search engine 20 has a query engine 22 and a database 24. Search engine 20 uses query engine 22 to query database 24 in response to search requests and other requests made over communications network 18.

Entities such as the American Banking Association and other parties may serve as sources 26 of whitelists and blacklists. Whitelists contain information identifying trusted websites and associated entities. Blacklists contain information identifying fraudulent websites.

A URL verification server 32 uses a URL verification engine 30 to perform URL verification operations. A user at computing equipment 12 (e.g., a user at computing equipment 12 without a complete local copy of a URL verification engine 30) can interact with server 32 over network 18. A local software component at a user such as client 31 of FIG. 1 may, for example, send URL verification requests to server 32. Such requests may be sent for each URL that the user browses to or may be sent in connection with only certain URLs (e.g., URLs whose trusted/untrusted status is determined to be uncertain after local preprocessing). For example, client 31 may perform preprocessing operations on each URL such as comparing the URL to a cache (e.g., a cache of previous verification results indicating which URLs are legitimately associated with which brands), comparing the URL to whitelists and blacklists to determine whether the URL is known to be trusted or untrusted, prefiltering the URL by examining the URL for suspicious features, etc. If the preprocessing operations indicate that the URL's status is uncertain, the client 31 may send the URL verification request to server 32. In response to verification requests from users, server 32 interacts with search engine 20 to determine whether URLs are fraudulent. The client 31 and engine 30 on equipment 12 may be provided as a browser plugin, as an integrated portion of web browser 28, as a stand-alone application, or using any other suitable arrangement.

When a server-based arrangement is used for the verification service, client 31 and web browser 28 interact as a user surfs the internet. The client 31 transmits information to URL verification server 32 such as all of the URLs to which the user is browsing or a subset of those URLs such as those URLs that local preprocessing operations by client 31 have not been able to classify as trusted or untrusted (e.g., by verifying their legitimate association with a brand). The URL verification server 32 works with search engines 20 to evaluate the authenticity of the URLs received in the verification requests from client 31. The URL verification server 32 can provide URL verification client 31 with the results of its evaluation operations, so that the client 31 can notify the user accordingly.

Figure 2:
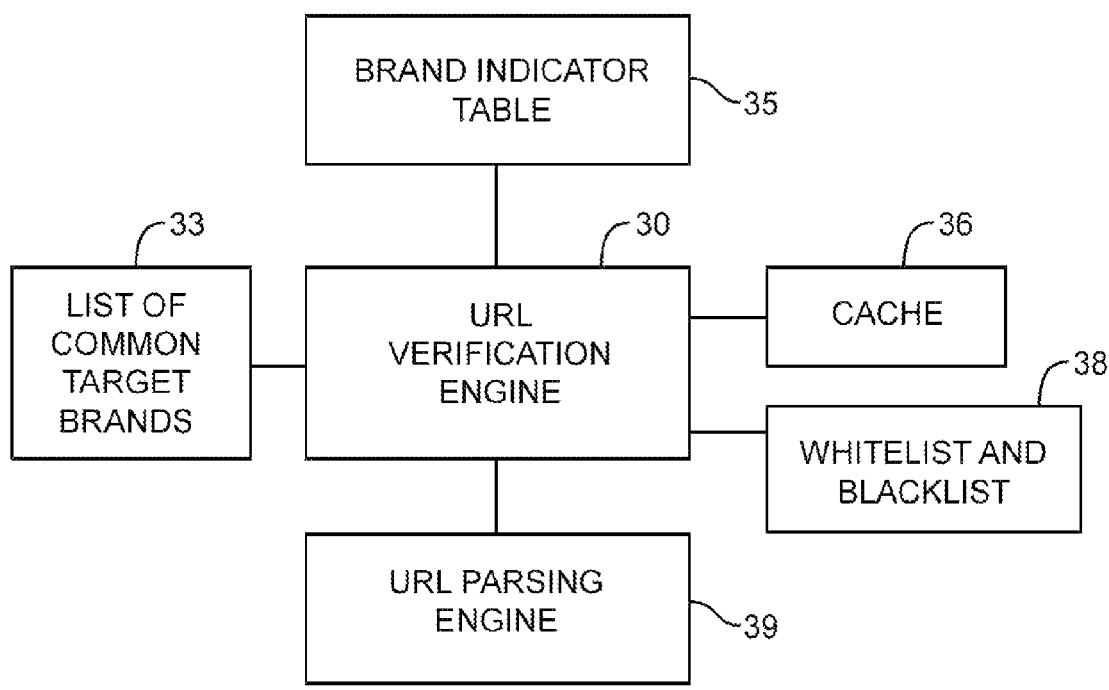
FIG. 2 is a diagram showing how a URL verification engine of the type used in the system of FIG. 1 may interact with other system components in accordance with the present invention.

As shown in FIG. 2, local and server-based verification engines 30 can consult cache 36. Cache 36 may be implemented using memory and storage devices in the computing equipment on which the verification engine 30 and/or client 31 is operating. Information such as the results of URL verification operations may be stored in cache 36. The results may include, for example, a list of which brands have been determined to be legitimately associated with which URLs and/or second level domains. During subsequent URL verification operations, the contents of cache 36 may be consulted to help determine whether a URL is authentic (e.g., by determining that a brand that appears to be associated with the URL has previously been determined to be legitimately associated with the URL's second level domain). Using cache 36 may reduce the computational burden that would otherwise be imposed on a system without cache capabilities and may therefore improve system performance.

During verification operations, local and server-based verification engines 30 can consult actively-maintained whitelists and blacklists 38. Local and server-based verification engines 30 can also consult a list of brands 33 that are either known to be targets of prior phishing attacks or are believed to be possible phishing targets. Brand indicator table 35 may contain information mapping certain page elements (e.g., certain logos and text strings) with particular brands.

Cache 36, lists 38 and 33, and table 35 may be maintained at the server 32, at the user computing equipment 12, or at both server 32 and equipment 12. For example, some or all of this information may be maintained at equipment 12 for consultation during browsing operations. If the client 31 is not able to ascertain the status of a particular URL by consulting a local cache 36 and locally-maintained lists 38, for example, the client 31 can interact with server 32 to complete additional verification operations.

Other architectures are also possible. For example, cache 36 may be maintained locally at user computing equipment 12 while lists 38, 33, and table 35 may be maintained at server 32 or cache 36 and lists 38 may be maintained at user equipment 12, while list 33 and table 35 may be maintained at server 32. The components of FIG. 2 may also be divided. For example, cache 36 may be divided so that some cache contents are located at user equipment 12 and other cache contents are located at server 32. The processing operations performed by the verification engine can also be divided, so that some operations are performed on user equipment 12 and other operations are performed on server 32.

Locally-implemented URL verification engines such as URL verification engine 30 in user computing equipment 12 may obtain a copy of the URL of the web page that the user is currently viewing from a web browser 28 (FIG. 1). The current URL can be parsed into components using the URL parsing capabilities of the web browser 28 or any other suitable URL parsing engine 39. In a server-based arrangement, URL verification engine 30 on URL verification server 32 may provide the URL parsing capabilities of engine 39. In general, cache 36, actively maintained whitelist and blacklist 38, list 33, table 35, URL parsing engine 39, and URL verification engine 30 may be implemented on user computing equipment such as computing equipment 12 and/or remote servers such as server 32 or any other suitable computing equipment.

Computing equipment 12 may be a personal computer, a workstation, a portable computing device such as a handheld computer, laptop, cellular telephone, or any other suitable computing device or network of such devices. The other entities in FIG. 1 such as sources 26, web sites 14 and 16, search engine 20, and URL verification server 32 may be provided using one or more servers or using any other suitable computing equipment arrangement. There may be a one-to-one correspondence between the entities and servers in system 10 or the entities of system 10 be provided using a distributed computing arrangement using multiple computers. For example, search engine 20 may be implemented using a cluster of servers. When multiple computers are used to support an entity's operations, the computers may be located at the same location or may be networked together using communications network 18. Network 18 may be any suitable wired and/or wireless network (e.g., the internet).

A user at computing equipment 12 uses a web browser 28 to surf the internet. There are generally numerous users in system 10.

In evaluating whether a web page's URL is associated with a trusted web site, the verification service may determine whether the URL has a valid top level domain. Information on which top level domains are valid may be stored as a list (e.g., as part of lists 38 or in any other suitable database structures).

With the arrangement shown in FIG. 1, software for implementing the URL verification service may be implemented on user computing equipment 12 as a built-in browser component or as a browser plug-in (e.g., URL verification engine 30) or may be implemented on equipment 12 and 32 (e.g., as a local URL verification client 31 and associated server-based URL verification engine 30). Search engine database query operations for supporting the URL verification service may be implemented using the database 24 and the database query engine 22 running at search engine 20. Any suitable number of search engines 20 may be included in system 10. When multiple search engines 20 are used, URL verification engine 30 may aggregate query results from the search engines to improve performance and provide redundancy.

Trusted web sites that a user may visit may include financial institutions such as the user's bank. During a typical online banking transaction, the user enters username and password information into a web page (a web "form"). When the user clicks on a login button or other suitable on-screen option, the contents of the web form are uploaded to the user's bank at site 14. The user's bank authenticates the user by comparing the uploaded username and password information to account information stored at the bank. If the user's username and password match the bank's account records, the user is permitted to access the user's bank account. The user may then withdrawal and transfer funds and perform other financial transactions.

Effective security in this type of system is dependent on the user guarding the secrecy of the username and password information. If the user can be tricked into revealing the username and password information to an unauthorized party, the unauthorized party may obtain access to the user's bank account.

One type of attack that may be used to attempt to trick the user into revealing the sensitive information such as username and password credentials is the so-called phishing attack. With a phishing attack, an attacker attempts to trick a user into revealing the user's secret information by masquerading as a trusted entity such as the user's bank. For example, the attacker may send an email to the user that purports to be a security alert from the user's bank. The email may contain the bank's logo and text that instructs the user to click on a web link. When the user clicks on the web link, the user's browser takes the user to a fraudulent web site 16, which directs the user to upload the user's secret information for an apparently legitimate purpose. To help trick the user, the attacker may use a URL for site 16 that looks similar to the URL of trusted web site 14.

As an example, the user may have an account at ABCD Bank. The URL of the legitimate web site 14 associated with ABCD bank may be www.abcdbank.com. In order to effectively trick as many people as possible, the attacker may create a fraudulent web site 16 with a URL of www.abcdbank.com.pqrst.com, where pqrst.com in this example is the second level domain associated with the attacker's fraudulent web site 16. Because the fraudulent URL appears to be associated with ABCD Bank to a casual observer, the user may be misled into believing that the user is at the web site of ABCD Bank and may not realize that the user's browser has in fact taken the user to the web site 16 of the attacker. If the user subsequently follows the instructions provided by the fraudulent web site 16 (e.g., to provide the user's username and password information for an apparently legitimate purpose), the username and password information will be uploaded to the attacker at fraudulent web site 16. The attacker can then use this information to obtain unauthorized access to the user's account at ABCD bank.

To overcome phishing attacks and other social engineering attacks that attempt to trick the user into revealing secret information, the URL verification service of the present invention evaluates the authenticity of web page URLs and their associated web sites during user browsing sessions. If a user attempts to view a web page associated with a web site that is known to be untrusted, the user may be warned and the web page may be blocked or other appropriate action taken.

If the authenticity of the web site is not known, the URL of the web page is used to evaluate the web page's and site's authenticity. In evaluating whether a URL and the web site and web page with which that URL is associated are to be trusted, the URL verification engine 30 on the user's equipment 12 communicates with search engine 20 or the URL verification client 31 communicates with URL verification server 32, which in turn communicates with search engine 20. The data provided by search engine 20 is used by the URL verification engine 30 in determining whether the URL and web site are legitimate. The results of this determination are provided to the user at URL verification client 31 or engine 30 on equipment 12 over network 18.

One of the inputs provided to the search engine 20 by the URL verification engine 30 is a brand that has been extracted from the URL and that is believed to be associated with the web site (e.g., the name of the bank or other organization that appears to own the web site). Brand information may be extracted from the URL of the web page by processing the URL using information such as the second level domain of the URL or using any other suitable technique.

During verification operations with search engine 20, the URL verification engine 30 uses information on the web page's URL and the brand as search query inputs. Using the information provided by the search engine 20 in response to these inputs, the URL verification engine 30 evaluates whether the URL is legitimately associated with the brand extracted from the URL ("ABCD Bank" in the present example). URL verification operations performed by engine 30 also involve using the content of the web page associated with the URL to validate the URL and evaluating what user data is collected as the user interacts with that web page.

The URL verification engine 30 may notify the user of the results of the URL evaluation process (directly if engine 30 is running locally on equipment 12 or through client 31 if engine 30 is running on server 32). The user can be notified of the results of the URL evaluation process by displaying a confirmation message indicating that the URL is legitimately associated with the brand or by displaying a warning that the URL cannot be verified. Other notification arrangements may also be used if desired. For example, the web pages associated with unverified URLs may be blocked or other protective actions may be taken as part of a notification scheme.

Figure 3:
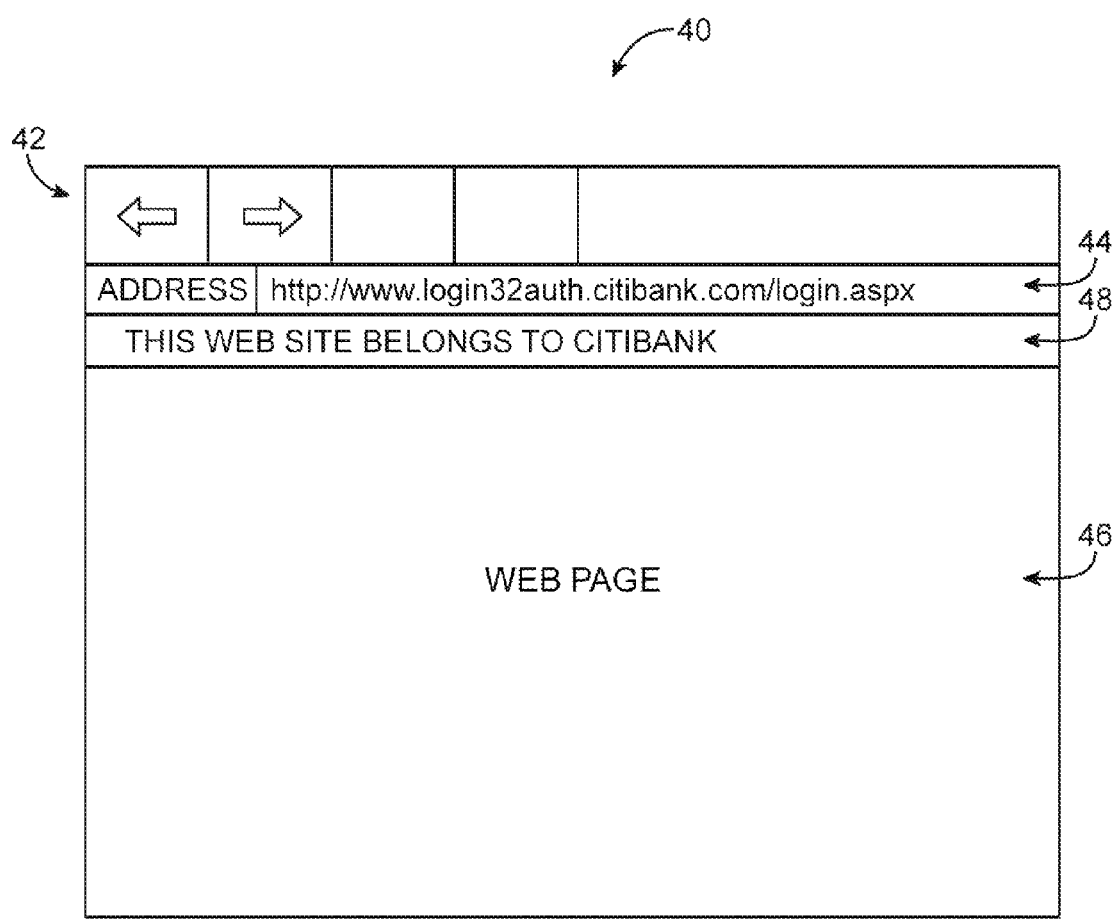
FIG. 3 shows an illustrative display screen that may be presented to a user when the user visits a web page that is legitimately associated with a trusted brand in accordance with the present invention.

Any suitable user interface may be used to notify the user of the results of URL verification operations. As an example, when the URL verification service determines that a given web page is part of a valid web site, a screen such as screen 40 of FIG. 3 may be displayed for the user at computing equipment 12. Screen 40 contains web browser buttons 42. Region 44 is used to display the URL of the current web page. The corresponding web page is displayed in region 46 by the web browser 28. A message may be displayed in region 48 to inform the user of the trusted status of the URL. The message may be, for example, a message generated by the URL verification engine that is displayed in a browser bar format as shown in FIG. 3. Valid status information may also be conveyed using icons or other visual indicators on an available portion of the display. If desired, audio messages may be used to notify the user.

The message displayed in region 48 may contain information on a brand that the URL verification service has determined is legitimately associated with the URL in region 44. In the example of FIG. 3, the URL in region 44 was legitimately associated with the bank "Citibank," so the message in region 48 informs the user that the web page is part of a web site associated with Citibank. If the user does not recognize the brand listed in region 48 or has other concerns, the user can take appropriate corrective actions.

Figure 4:
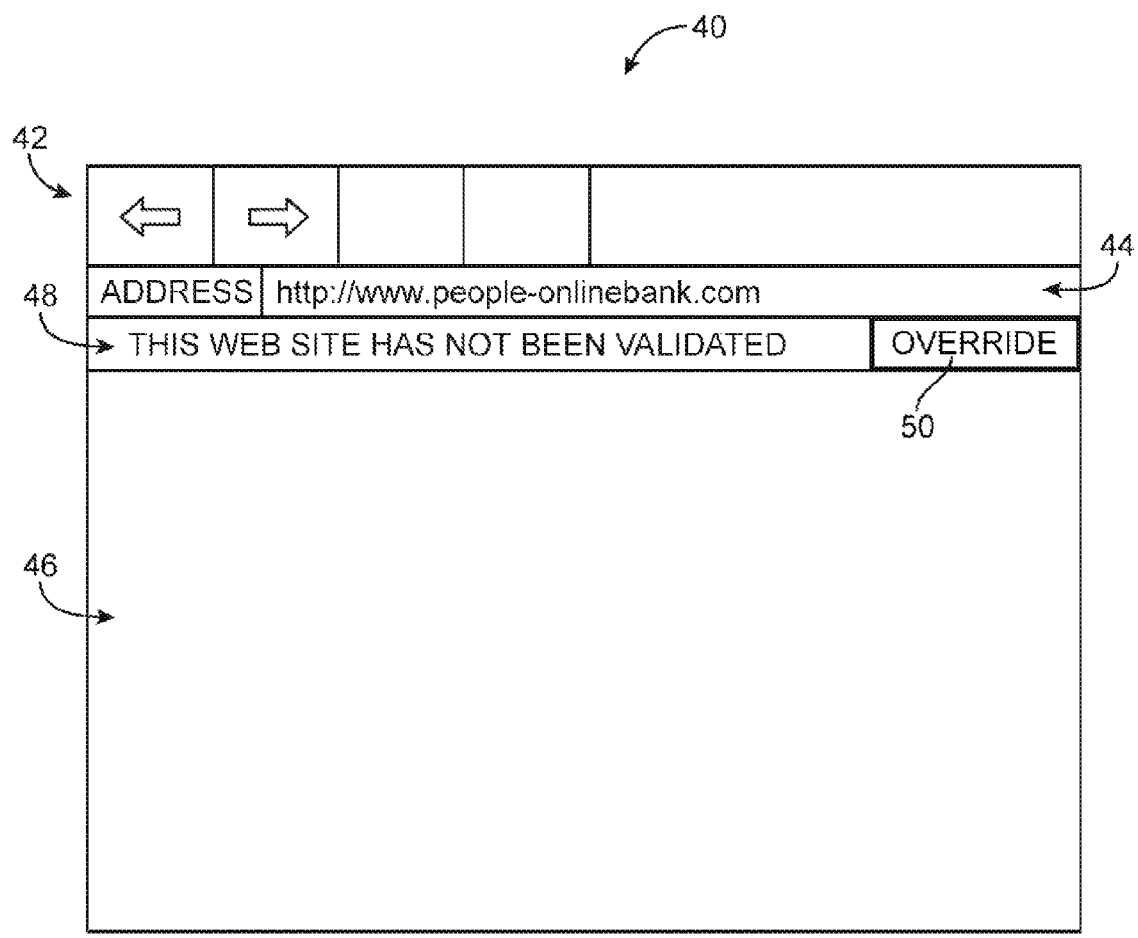
FIG. 4 shows an illustrative display screen that may be presented to a user when the user attempts to visit an untrusted web page in accordance with the present invention.

When the URL verification service determines that a given web page is from a fraudulent web site 16 or is suspicious, the verification results message provided to the user includes a warning. As an example, a screen such as screen 40 of FIG. 4 may be displayed on the user's computing equipment 12. In screen 40 of FIG. 4, web browser buttons are displayed in region 42. Region 44 contains the URL of the unverified web page. Because the URL verification service was unable to verify that the web page URL is trusted, a warning is being displayed in region 48. In addition to or instead of displaying the warning in region 48, a warning icon or other visual indicator may be displayed or an audio alert may be generated to indicate that the URL in address region 44 is untrusted. In the example of FIG. 4, the web page corresponding to the URL of region 44 has been blocked and is therefore not being displayed in region 46. If desired, the untrusted web page could be displayed, particularly if sufficient warning is provided using warnings such as the warning of region 48.

Sometimes a user may desire to override the determination made by the URL verification service. For example, if a URL is associated with an obscure brand, the URL verification service may not be able to ascertain the URL's validity. Nevertheless, if the user believes that the URL is valid, the user can direct the URL verification service to add the URL and/or its associated web site to a list of trusted URLs/sites. For example, the user can direct the URL verification service to treat the URL as trusted by clicking on an override button. If the web page for the URL of region 44 was being blocked, clicking on an override button will direct the service to allow the user's web browser 28 to display the web page in region 46.

As the user surfs the web, the URL verification service can capture URLs (e.g., from browser 28). The captured URLs can be processed locally on equipment 12 or can be transmitted over network 18 to server 32. In evaluating the URL, the URL verification service can automatically extract a brand from a captured URL.

In evaluating whether a given URL is trusted, the URL is parsed into its constituent components (top level domain, second level domain, etc.). Web browser 28 contains a URL parsing engine that the URL verification service can use for URL parsing. The URL verification service can also use other parsing arrangements. For example, a URL parsing engine may be implemented on server 32 that is not part of a web browser.

Figure 5:
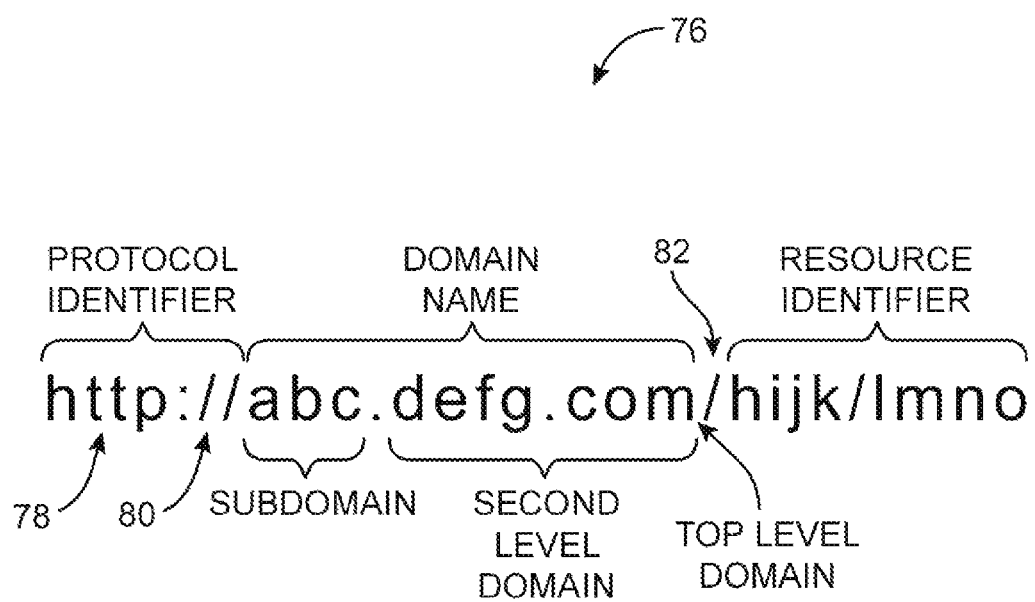
FIG. 5 is a diagram showing the components in a typical universal resource locator (URL).

The parts of a typical web page URL 76 are shown in FIG. 5. As shown in FIG. 5, the URL has an associated protocol identifier 78. Web pages are identified by the protocol identifier "http". The portion of the URL between double forward slashes 80 and the first single forward slash 82 corresponds to the URL's domain name portion. The domain name includes a top level domain such as .com, .gov, .org, etc. and a second level domain. The domain name may also include an optional subdomain portion. The second level domain is sometimes referred to as the web site address associated with the URL. Individual web pages at the site share the same second level domain, but are differentiated through the use of unique subdomains and/or resource identifiers.

Figure 6:
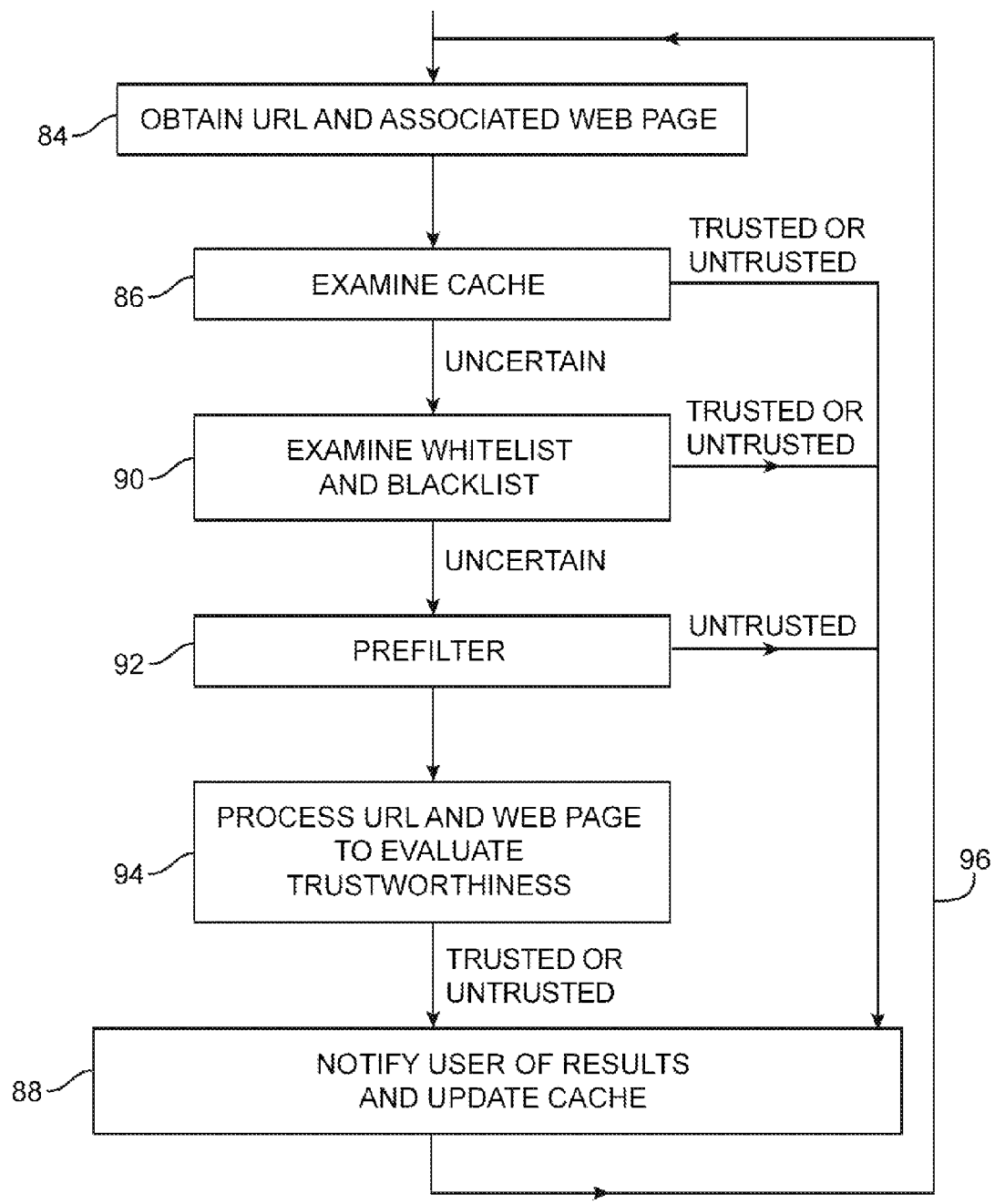
FIG. 6 is a flow chart of illustrative steps involved in using cache and other system components in ascertaining whether a URL is legitimate in accordance with the present invention.

The flow chart of FIG. 6 shows operations involved in using the URL verification service to determine whether a given URL is legitimately associated with a trusted web site.

At step 84, the service obtains a URL of unknown authenticity that the user is currently using to surf the internet. For example, the service may obtain the URL from browser 28. In a server-based architecture, the captured URL can be transmitted to the server 32 for processing. The URL is parsed to identify URL components of the type shown in FIG. 5. If, for example, the URL is www.login32auth.citibank.com/login.aspx, the service may parse the URL to obtain the second level domain "citibank.com." A brand may be extracted from the second level domain. For example, the brand "Citibank" can be extracted by discarding the ".com" suffix from the second level domain "citibank.com." (i.e., by discarding the top level domain portion of the second level domain).

At step 86, the URL verification engine 30 examines cache 36 (FIG. 2). Cache 36 preferably contains a list of second level domains (web site addresses) that are known to be trusted or untrusted from previous verification operations. Cache 36 may also contain information on known legitimate associations between brands and second level domains. Storing these results in cache 36 improves performance and obviates the need for additional processing.

If the URL verification engine 30 determines from cache 36 that the URL is trusted or determines from cache 36 that the URL is untrusted, the verification process is complete and the user is notified of the results of the verification at step 88. Processing then loops back to step 84, as indicated by line 96.

If the URL verification engine 30 cannot determine the status of the URL from the cache 36 at step 86, the status of the URL remains uncertain. Accordingly, at step 90, the URL verification engine can consult actively maintained whitelist and backlist 38 (FIG. 2) to determine whether the URL is trusted. The whitelist may be a list of URLs and/or domain names, or other URL components that identify trusted web pages, web sites, and the entities associated with these sites. The whitelist may include, as an example, the second level domains for all known legitimate banks and the brand names of those banks, as published by a trusted whitelist source 26 such as the American Banking Association. The blacklist may include, as an example, a list of second level domains associated with fraudulent websites. The blacklist may contain information from a security service or other party that maintains information on the operators of fraudulent web sites 16. The whitelist and blacklist 38 are preferably actively maintained (e.g., by an administrator at server 32 that uses tools at server 32 to add, delete, and edit whitelist and blacklist entries).

In using cache and the whitelist and blacklist information to determine whether or not a URL is trusted, all or a portion of the URL may be compared to the cache, the whitelist, and the blacklist. In one suitable arrangement, the URL verification engine 30 maintains a local database in cache 36 that contains mappings between second level domain names (e.g., wellsfargo.com) and corresponding brands (e.g., Wells Fargo), and maintains a list of untrusted sites (h4x0rsRUs.com).

If the lists 38 that are consulted during step 90 indicate that the URL is trusted or indicate that the URL is untrusted, the user is notified accordingly at step 88. The cache can also be updated. Processing then loops back to step 84, as indicated by line 96.

If lists 38 do not contain information that indicates the status of the URL, prefiltering operations may be performed at step 92. During step 92, the URL verification engine 30 can examine the URL for features that are known to be suspicious and not normally associated with legitimate commercial sites. Any suitable URL characteristics may be considered when using the URL verification engine 30 to determine whether the URL is suspicious during the prefiltering operations. As an example, use of a numeric form URL or a URL containing an @ form indirection may be considered untrustworthy. An illustrative numeric form URL is http://145.67.42.1/login.aspx. An illustrative URL containing an @ form indirection is http://www.bank.com/login.aspx@phisher.com. In this type of URL, the actual web site to which the user is directed is phisher.com, rather than bank.com. Numeric form URLs and URLs with @ form indirections are typically only used in development projects or while sites are under construction. In these situations, sophisticated users can ignore or override warnings provided by the URL verification engine 30.

During the prefiltering operations of step 92, the URL verification engine 30 determines whether the top level domain of the URL is trusted. In performing this operation, the URL verification engine 30 may consult a list of valid top level domains. The list used to validate the top level domains may be the list of valid top level domains published by the Internet Assigned Numbers Authority (IANA) or may be based on an IANA list. If the top level domain of the URL does not appear in the list of valid top level domains, the URL verification engine 30 can conclude that the URL is untrusted. If the results of the prefiltering operations of step 92 reveal that the URL is untrusted, the user can be notified accordingly at step 88. Processing then loops back to step 84, as indicated by line 96.

If the prefiltering operations of step 92 do not indicate that the URL is untrusted, additional processing may be performed at step 94. During step 94, the URL verification engine 30 can evaluate how closely the extracted brand is tied to the URL (e.g., using the brand and second level domain of the URL as inputs to the search engine 20 and evaluating the results). The content of the web page associated with the URL can also be evaluated to help determine whether the URL is authentic. The URL verification engine 30 can also determine whether the web page is collecting sensitive information from the user such as a credit card number. Following the evaluation operations of step 94, the user can be notified accordingly at step 88. Processing then loops back to step 84, as indicated by line 96.

If desired, the steps of FIG. 6 can be performed in other suitable orders or one or more steps can be omitted. For example, prefiltering step 92 could be performed before examining lists 38 at step 90 or step 92 could be omitted. Moreover, the processing operations of step 94 can involve some or all of the other operations described in connection with FIG. 6.

Figure 7:
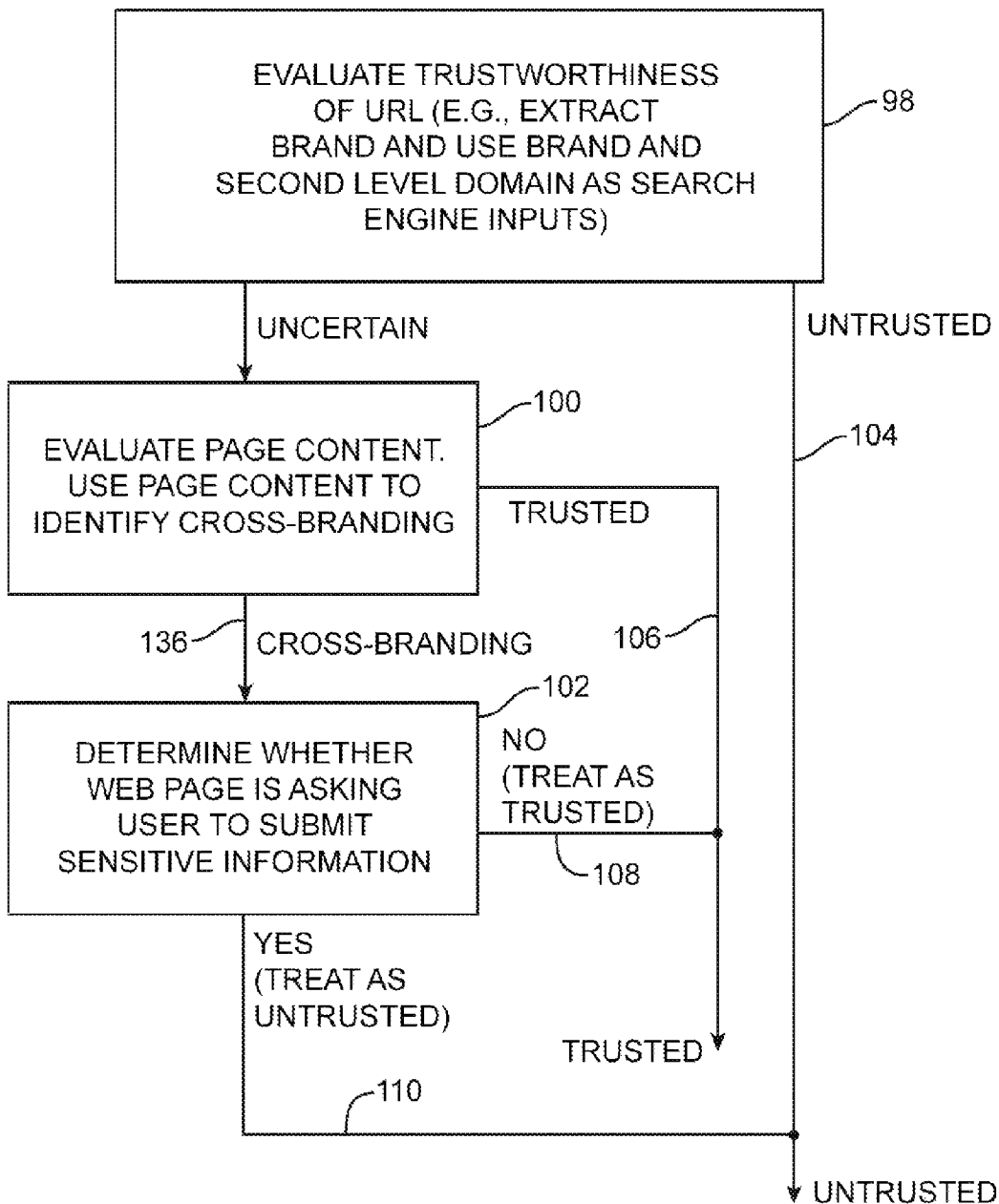
FIG. 7 is a flow chart of illustrative steps involved in processing a URL and an associated web page to evaluate whether a URL is trusted in accordance with the present invention.

A flow chart of illustrative URL evaluation operations that may be performed during step 94 of FIG. 6 is shown in FIG. 7. The operations of FIG. 7 can be performed after step 92 of FIG. 6. When the evaluation operations of FIG. 7 are complete, the user can be notified of the results at step 88 of FIG. 6. The operations of FIG. 7 can be performed at user equipment 12, at server 32, or partly at equipment 12 and partly at server 32.

At step 98, the URL verification engine 30 evaluates the trustworthiness of the URL by determining how well the brand that appears to be associated with the URL is bound to the URL. With one suitable approach, the URL verification engine extracts a brand from the URL (e.g., by discarding the ".com" suffix from the second level domain of the URL) if this operation has not already been performed in connection with steps 84, 86, 90, and 92 of FIG. 6. The second level domain and extracted brand are then used as inputs to search engine 20 (e.g., to determine the number of links to the web site associated with the second level domain and to determine how highly the second level domain name ranks in a ranked list of second level domains containing the brand). These results are used as trustworthiness metrics (alone or in combination). If the URL appears to be untrusted from these metrics, the URL can be considered to be untrusted, as indicated by line 104. If the URL status is uncertain, additional processing may be performed by the URL verification engine 30 at step 100.

During step 100, the URL verification engine can evaluate the content of the web page associated with the URL. The web page content can be validated using any suitable technique. For example, if the web page is a non-SSL (secure sockets layer) web page, the HTML contents of the page can be examined to determine whether the page contains password fields. The inclusion of a password field on a non-SSL page is indicative of potential fraud. As another example, terms on the page can be used to identify the brand that is being presented to the user. Cross-branding situations arise when the brand or brands that appear to a user to be associated with a web page do not match the brand extracted from the URL. If no cross-branding is detected, the web site and URL can be treated as trusted, as indicated by line 106.

If cross-branding is detected, the URL verification engine 30 can perform additional URL verification operations during step 102. During step 102, the URL verification engine 30 can determine whether the nature of the web page is such that the user is at risk of divulging sensitive information. For example, during step 102, the URL verification engine 30 can determine whether the web page is requesting that the user submit data over network 18. If the web page is not attempting to gather any information from the user, the threat from the page is relatively low, so the page may be treated as trusted, as indicated by line 108. If the web page is gathering information from the user, the URL verification engine 30 can evaluate the nature of the submitted data (e.g., by intercepting data that the user types into a web form before the data is uploaded to the web site). If the user is uploading harmless data, the URL can be treated as trusted (line 108). If, however, the URL verification engine 30 determines that user is uploading a credit card number or other sensitive information, the URL verification engine 30 can treat the URL as untrusted, as indicated by line 110. If the URL is untrusted, the URL verification engine 30 can block the data from being uploaded and can otherwise notify the user of the untrusted status of the URL during step 88 (FIG. 6).

Figure 8:
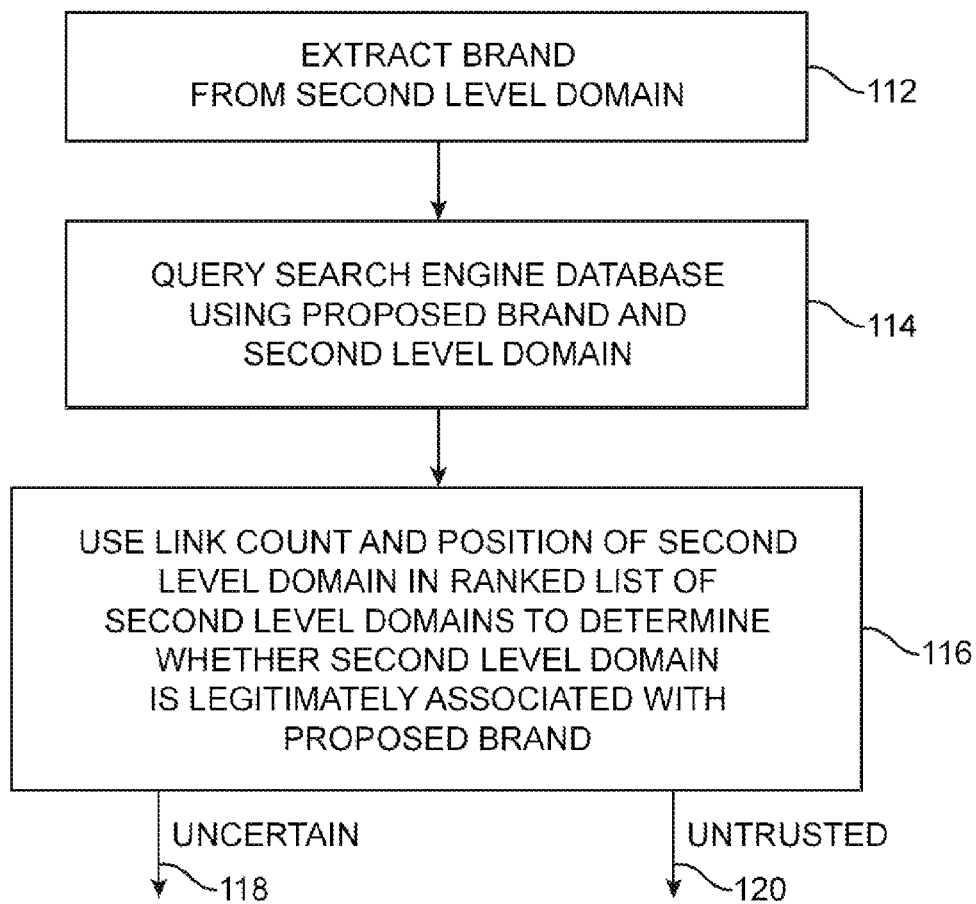
FIG. 8 is a flow chart of illustrative steps involved in using a search engine to generate trustworthiness metrics for a URL in accordance with the present invention.

Illustrative steps that may be used during the trustworthiness evaluation of step 98 of FIG. 7 are shown in FIG. 8.

At step 112, the brand that appears to be associated with the URL may be automatically extracted from the URL if this operation has not already been performed. The brand that is extracted is the brand that should be legitimately associated with the URL of the web page that the user is interested in visiting. As an example, engine 30 may extract the brand "Citibank" from a URL containing the second level domain "citibank.com" by discarding the ".com" suffix. Some second level domain formats require that additional information be stripped when extracting the brand. For example, a web site in the United Kingdom that is associated with the United Kingdom branch of Barclays bank may have a second level domain of "barclays.co.uk". In this type of situation, both the top level domain ".uk" and the company suffix ".co" are stripped from the second level domain by the URL verification engine 30. Brand extraction operations such as this may supported by including supplemental information in a valid top level domain name list maintained by engine 30. URL verification engine 30 can use this supplemental information in extracting the brand.

At step 114, the URL verification engine 30 uses the second level domain from the domain name and the extracted brand as inputs to the search engine 20. The search engine uses these inputs in formulating database queries that query engine 22 uses to query database 24. In response to the database queries, database 24 supplies information that can be used to gauge the likelihood that the second level domain and extracted brand are legitimately associated with each other.

With one suitable approach, the URL verification engine 30 formulates a database query for search engine 20 that asks the search engine 20 to use query engine 22 to query database 24 to determine how many web links exist to the second level domain (i.e., to the web site defined by the second level domain). The count of the number of links to the second level domain is used by the URL verification engine as an indicator of centrality. The link count is used to indicate the degree to which other web sites and pages link to the web site associated with the URL of unknown authenticity. If desired, the search engine 20 may take into account the centrality of the linking sites in determining the centrality of the second level domain. With this type of approach, links from blogs and untrustworthy machines are not included in the link count and will therefore not undesirably skew the measure of centrality. Because attackers generally construct their fraudulent sites 16 so that they will go unnoticed and be difficult to locate and shut down, the URL verification engine 30 preferably requires a sufficient level of centrality for a site to be considered trustworthy.

During step 114, the URL verification engine 30 also uses the extracted brand as an input to search engine 20. In particular, the URL verification engine 30 queries the search engine 20 using the brand as an query term (input) for use by query engine 22 in querying database 24. The query made to the search engine 20 directs the search engine 20 to produce a ranked list of which second level domains have pages that contain the extracted brand. If desired, additional queries may be made using the extracted brand. As an example, a query may be made that directs the search engine 20 to return a count of how many web pages contain the brand (e.g., the text string "Citibank"), which gives further information on the legitimacy of the brand.

The queries of step 114 may be performed as a single query or multiple queries. An example of a search engine that supports the queries of step 114 is the Google internet search engine of Google, Inc.

Some brands contain two words (e.g., Wells Fargo). An incorrectly spelled or incorrectly formatted brand (e.g., wellsfargo) can be converted into a correctly spelled and formatted brand (e.g., Wells Fargo) using a spell checker function associated with search engine 20. The correct spelling and format for the brand may be used, for example, when the URL verification server 32 provides the extracted brand to the URL verification client 30 to display for the user. The correct spelling and format for the brand may also be used when using query engine 22 to query database 24 during the process of evaluating the authenticity of the URL.

The format for the search engine queries depends on the type of search engine interface (API) being used. With one suitable approach, the search engine is initially queried for an improved spelling for the extracted brand. If an improved spelling is identified by the search engine, the brand with the improved spelling may be used to query the search engine. With another suitable approach, the brand is used to query the search engine without specifically requesting an improved spelling. In response to the query, the search engine automatically suggests an improved spelling. If an improved spelling is suggested, it may be used to query the search engine.

The extracted brand queries of step 114 direct the search engine 20 to provide the URL verification engine 30 with a ranked list indicating, in order of popularity, the second level domains that have web pages including the brand. The ranked list shows which web sites (second level domains) are most associated with the brand. Any suitable number of entries may be returned in the ranked list. For example, the ranked list may include the top 5 or top 10 web sites containing the proposed brand. The position of the second level domain in the ranked list (e.g., in the top or first position, in the second position, etc.) is indicative of the legitimacy of the second level domain. Legitimate web sites will tend to appear in the top 5 or 10 positions in the ranked list. The verification engine 30 can determine the position of the second level domain in the ranked list or the search engine 20 can provide verification engine 30 with the position value.

At step 116, the link count and the position of the second level domain in the ranked list are used by the URL verification engine 30 to determine whether the second level domain is legitimately associated with the proposed brand. During step 116, the URL verification engine 30 compares the second level domain from the URL to the second level domains in the ranked list to determine the placement of the second level domain from the URL within the ranked list (e.g., at the top of the list, second from the top, in the top 5, in the top 10, etc.). If desired, search engine 20 may determine the rank of the second level domain within the ranked list and may provide the rank to the URL verification engine 30 rather than the ranked list. In this case, the URL verification engine obtains the list position of the second level domain from the search engine, rather than ascertaining the position by comparing the second level domain to the ranked list.

A high ranking in the list indicates that the web site (second level domain) associated with the URL is an authoritative site for the proposed brand. For example, it is likely that the official web site for a bank would be among the most highly ranked sites containing the bank's name. In this situation, the rank of the bank's web site in the ranked list might be number one or number two.

Any suitable computations may be used to determine whether the second level domain from the URL is legitimately associated with the proposed brand.

With one suitable approach, Boolean trust factors TI1 and TI2 are calculated using equations 1 and 2.

$$TI1 = (LC > 1000) \quad (1)$$

$$TI2 = (RANK < 6) \quad (2)$$

In equation 1, the variable LC represents the link count (i.e., the number of links to the web site corresponding to the URL). In equation 2, the variable RANK represents the rank of the second level domain within the ranked list of second level domains. The variables that are returned by the search engine during trustworthiness evaluation operations such as variables LC and RANK are sometimes referred to as URL trustedness parameters or page trustedness parameters.

The trust factor formulas of equations 1 and 2 use Boolean logic. If the link count LC is above a user-specified or default link count threshold (1000 in this example), TI1 is 1, otherwise TI1 is 0. If the variable RANK is less than a user-specified or default rank threshold (6 in this example), the value of TI2 in equation 2 is 1, otherwise TI2 is 0.

During step 116, the values of TI1 and TI2 can be combined using suitable Boolean logic to determine whether the URL is untrusted. With one suitable approach, the URL is considered to be untrusted (line 120 of FIG. 8) if both TI1 and TI2 are 0. If the URL is not determined to be untrusted (i.e., if TI1 or TI2 or both are 1), the status of the URL is uncertain (line 118 of FIG. 8). When the status of the URL is determined to be uncertain during step 116, additional processing is performed at step 100 (FIG. 7).

Figure 9:
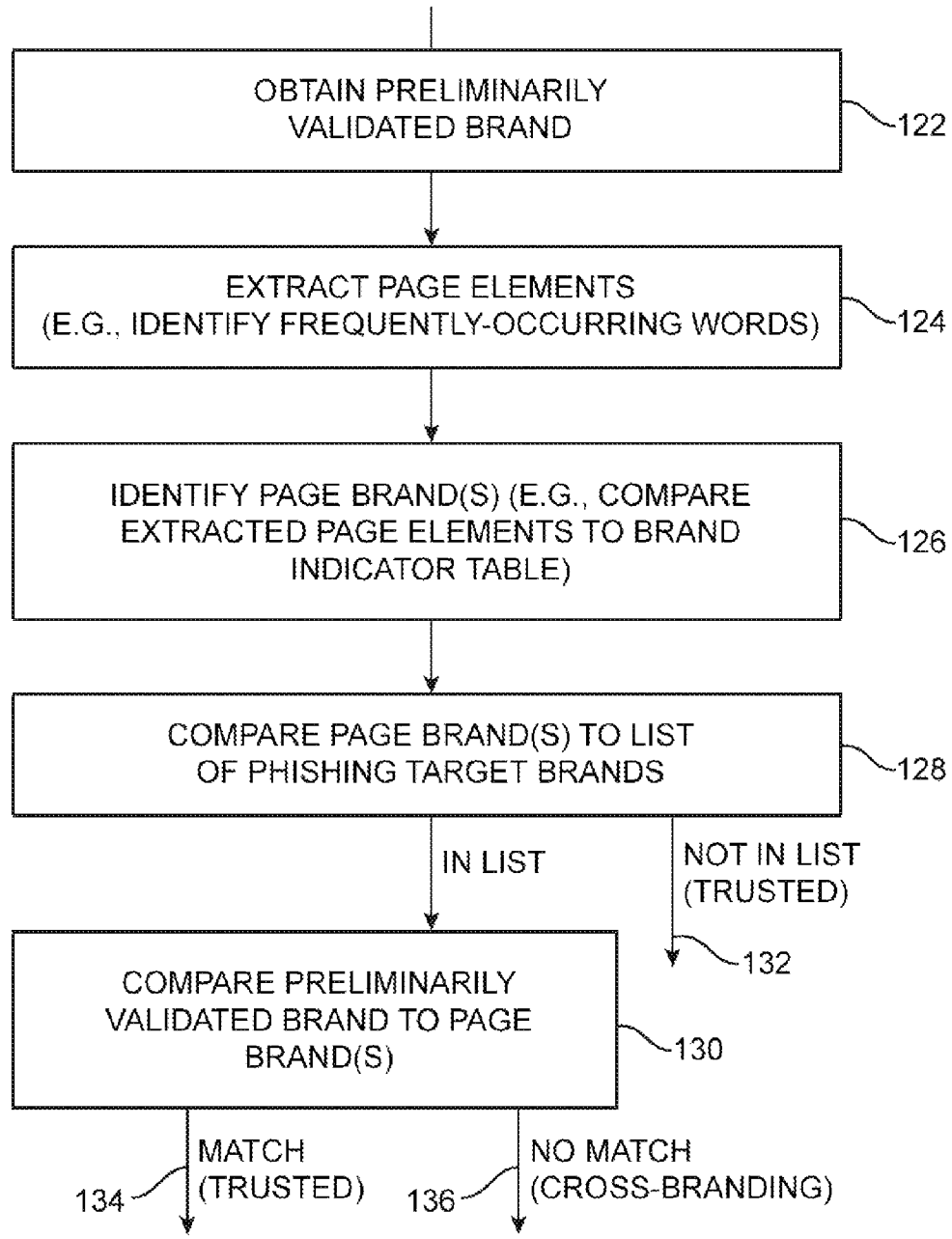
FIG. 9 is a flow chart of illustrative steps involved in using page content to evaluate the trustworthiness of a URL in accordance with the present invention.

Illustrative steps that may be used by the URL verification engine 30 during step 100 of FIG. 7 are shown in FIG. 9. The operations of FIG. 9 are used to validate the content of the web page. Page validation operations such as these are preferably used to supplement the extracted brand validation operations of FIG. 8.

As shown in FIG. 9, the URL verification engine 30 obtains the brand that has been processed during step 98 of FIG. 7 (e.g., using the operations of FIG. 8 or any other suitable arrangement) at step 122. Because the brand extracted from the URL has been determined to not be untrusted, the extracted brand at this stage is sometimes referred to as being preliminarily validated.

At step 124, the URL verification engine extracts page elements such as text strings, logos or other images (e.g., JPEGs), embedded web links, and other page elements from the web page that is associated with the URL. During the extraction process, the URL verification engine may, for example, identify words that occur frequently within the page.

At step 126, the URL verification engine 30 identifies one or more brands associated with the web page. These associated brands are sometimes referred to as page brands, because they are the brands that appear to users to be legitimately associated with the page. Any suitable technique may be used to identify page brands from the web page. With one suitable approach, the URL verification engine 30 compares extracted page elements to a column of page elements in a brand indicator table 35 (FIG. 2). If a match between the extracted page elements and the page elements in the brand indicator is identified, the brand that is related to the page element(s) will be used as the page brand.

An illustrative brand indicator table 35 is shown in FIG. 10. In the FIG. 10 example, the presence of the page elements "brand146" and "account number" indicate that the web page is apparently associated with the page brand "brand456"), as shown in the third row of table 35. If the page element "www.brand123.com/passwordreset" is extracted from the web page (i.e., by virtue of being a web link present on the web page), the URL verification engine 30 can conclude that the page brand is "brand123" (in this example).

After identifying the page brand (or brands) at step 126 of FIG. 9, the URL verification engine 30 compares the page brand (or brands) to a list of common phishing target brands 33 (FIG. 2). List 33 may include a list of banks, auction sites, internet service providers (ISPs), etc. If a page brand (or brands) does not appear in list 33, the URL may be treated as trusted (line 132).

If the URL verification engine 30 determines that the page brand (or brands) is contained in the list of common target brands 33 during step 128, the URL verification engine 30 can compare the page brand (or brands) to the preliminarily validated brand at step 130.

If there is a match between the preliminarily validated brand and a page brand, the page brand and the brand extracted from the second level domain are consistent. The URL may therefore be treated as trusted (line 134 of FIG. 9 and line 106 of FIG. 7). The user may be notified accordingly at step 88 of FIG. 6.

If there is no match between the preliminarily validated brand and the page brand, the page has been cross-branded (line 136 of FIGS. 7 and 9) and may be processed further at step 102 of FIG. 7 to determine whether the user is being asked to upload sensitive content.

If desired, the URL verification engine 30 may use a cross-branding parameter to quantify the degree of cross-branding. The URL verification engine 30 can also check the web page for non-brand-based indicators of trustedness. The inclusion of password fields on non-SSL pages, the inclusion of non-obscure password fields, and the presence of an expired SSL certificate are examples of non-brand-based page attributes that are indicative of fraudulent pages. If the URL verification engine 30 detects these attributes, the URL may be treated as untrusted or the cross-branding parameter can be refined to reflect a reduced level of trustedness. Following refinement of the value of the cross-branding parameter, the cross-branding parameter can be compared to a threshold to make a final determination of whether there is cross-branding. If cross-branding is present, processing follows path 136 in FIG. 9.

Figure 11:
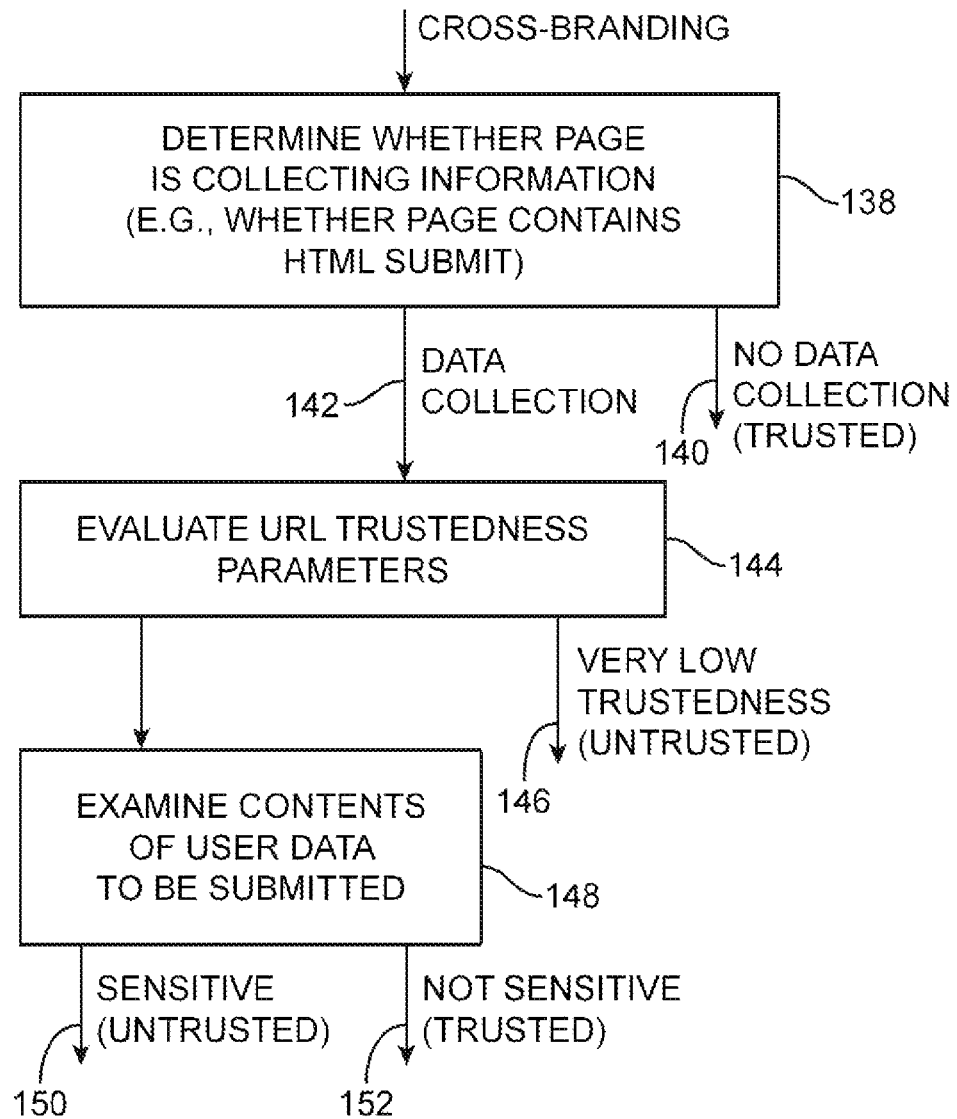
FIG. 11 is a flow chart of illustrative steps involved in determining whether a user interacting with a web page is uploading sensitive information in accordance with the present invention.

If cross-branding is present, additional processing is performed during step 102 of FIG. 7 to determine whether the web page is collecting sensitive information from the user. Illustrative steps that may be used during step 102 of FIG. 7 are shown in FIG. 11.

At step 138, the URL verification engine 30 determines whether the web page associated with the URL is collecting information from the user. Any suitable technique may be used to determine whether the web page is collecting user data. With one suitable approach, the web page is examined to determine whether the web page contains an HTML submit, which indicates that data can be collected by the page. If the web page is not capable of collecting data, the risk associated with allowing the user to view the page in browser 28 is low. Accordingly, when no data is being collected, the URL can be treated as trusted (line 140).

If the URL verification engine 30 determines at step 138 that the web page is capable of collecting information from the user, the URL verification engine 30 evaluates the URL trustedness parameters that were obtained using the search engine during step 98 (FIG. 7). The URL trustedness parameters that are available to the URL verification engine 30 at step 144 generally depend on the type of search engine queries that were formulated during step 98. If, for example, the search engine queries of step 98 generated a link count trustedness parameter LC and a second level domain rank trustiness parameter RANK, as described in connection with equations 1 and 2, the LC and RANK values may be used during step 144 to evaluate the level of trustedness of the URL.

If the LC and RANK values are both low (i.e., they are both below default or user-selected threshold values), the URL has a very low trustedness value. As a result, the URL verification engine 30 treats the URL as untrusted, as shown by line 146 in FIG. 11. If, however, the LC and RANK values are not both low, the URL verification engine 30 evaluates the data that the user is submitting to the web site at step 148 to determine whether the user data is sensitive.

For example, if the URL verification engine 30 determines at step 148 that the user is using the web page to upload a financial account number, the URL verification engine 30 will conclude that the contents of the data being uploaded is sensitive. Other conditions that are indicative of the uploading of sensitive data include: data that is in the form of a personal identification number (PIN), data in the form of a credit card number, data in the form of a social security number or other government ID (with or without dashes), data in the form of an expiration date, and data in the form of a credit card security code. The URL verification engine 30 can test whether a numeric string is a valid credit card number using any suitable verification algorithm such as the LUHN algorithm.

Because the uploading of sensitive information to a fraudulent web site is potentially dangerous, the URL is treated as untrusted if the URL verification engine detects sensitive information during step 148, as indicated by line 150.

The foregoing is merely illustrative of the principles of this invention and various modifications can be made by those skilled in the art without departing from the scope and spirit of the invention.

What is claimed is:

1. A method for determining whether web page universal resource locators (URLs) are associated with trusted or fraudulent web sites, comprising:

as a user browses the world wide web using computing equipment, obtaining by a URL verification engine on the computing equipment a URL for a web page of unknown authenticity, wherein the URL comprises a second level domain and wherein the second level domain comprises a top level domain;

extracting by the URL verification engine on the computing equipment a brand name from the URL, wherein the brand name comprises a portion of the second level domain and wherein extracting the brand name from the URL comprises discarding the top level domain;

determining by the URL verification engine on the computing equipment whether the URL is untrusted using the extracted brand name as at least one input to an internet search engine, wherein determining whether the URL is untrusted using the extracted brand name comprises:

using the extracted brand name and the second level domain to query the internet search engine to produce a link count value and a ranked list of second level domains; and using the link count value and a position of the second level domain in the ranked list in computing a Boolean trust value and using the Boolean trust value in determining whether the URL is trusted or untrusted;

if the URL is not determined to be untrusted, evaluating by the URL verification engine on the computing equipment content in the web page to identify at least one page brand name that is associated with the web page and comparing the page brand name to the extracted brand name, wherein evaluating the content in the web page comprises:

extracting page elements from the web page; and comparing the extracted page elements to information in a brand indicator table to identify the page brand name;

determining by the URL verification engine on the computing equipment whether cross-branding is present, wherein cross-branding is present if the page brand name is different from the extracted brand name; and if it is determined that cross-branding is not present, notifying the user that the URL is trusted.

2. The method defined in claim 1 further comprising:
if cross-branding is determined to be present, determining by the URL verification engine on the computing equipment whether the web page can be used to collect information from the user.

3. The method defined in claim 1 further comprising:
if cross-branding is determined to be present, determining by the URL verification engine on the computing equipment whether the web page is asking the user to submit sensitive information.

4. The method defined in claim 1 further comprising:
if cross-branding is determined to be present, determining by the URL verification engine on the computing equipment whether the web page is asking the user to upload a credit card number.

5. The method defined in claim 1 further comprising:
if cross-branding is determined to be present, determining by the URL verification engine on the computing equipment whether the web page is asking the user to submit sensitive information; and
if it is determined that the web page is asking the user to submit sensitive information, notifying the user that the URL is untrusted.

6. The method defined in claim 1 wherein evaluating by the URL verification engine on the computing equipment the content in the web page further comprises
comparing the page brand name to a list of phishing target brands.

7. The method defined in claim 1 further comprising:
comparing by the URL verification engine on the computing equipment the page brand name to a list of phishing target brands; and
if comparing the page brand name to the list of phishing target brands reveals that the page brand name is not in the list of phishing target brands, notifying the user that the URL is trusted.

8. The method defined in claim 1 further comprising:
comparing by the URL verification engine on the computing equipment the page brand name to a list of phishing target brands; and
if comparing the page brand name to the list of phishing target brands reveals that the page brand name is in the list of phishing target brands, comparing the extracted brand name to the page brand name.

9. The method defined in claim 1 further comprising:
comparing by the URL verification engine on the computing equipment the page brand name to a list of phishing target brands;
if comparing the page brand name to the list of phishing target brands reveals that the page brand name is in the list of phishing target brands, comparing the extracted brand name to the page brand name; and
if comparing the extracted brand name to the page brand name produces a match, notifying the user that the URL is trusted.

10. The method defined in claim 1 further comprising:
comparing by the URL verification engine on the computing equipment the page brand name to a list of phishing target brands;
if comparing the page brand name to the list of phishing target brands reveals that the page brand name is in the list of phishing target brands, comparing the extracted brand name to the page brand name; and
if comparing the extracted brand name to the page brand name does not produce a match, determining whether the web page is asking the user to submit sensitive information.

11. The method defined in claim 1 further comprising:
comparing by the URL verification engine on the computing equipment the page brand name to a list of phishing target brands;
if comparing the page brand name to the list of phishing target brands reveals that the page brand name is in the list of phishing target brands, comparing the extracted brand name to the page brand name;
if comparing the extracted brand name to the page brand name does not produce a match, determining whether the web page is asking the user to submit sensitive information; and
if it is determined that the web page is asking the user to submit sensitive information, notifying the user that the URL is untrusted.

12. The method defined in claim 1 further comprising:
if comparing the extracted brand name to the page brand name does not produce a match, determining by the URL verification engine on the computing equipment whether the web page is asking the user to submit sensitive information; and
if it is determined that the web page is asking the user to submit sensitive information, notifying the user that the URL is untrusted.

\* \* \* \* \*